United States Patent
Perdomo et al.

(10) Patent No.: US 7,395,097 B2
(45) Date of Patent: Jul. 1, 2008

(54) COMMUNICATIONS DEVICE WITH LOW ENERGY NOTIFICATION

(75) Inventors: Jorge L. Perdomo, Boca Raton, FL (US); Von A. Mock, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 326 days.

(21) Appl. No.: 11/003,152

(22) Filed: Dec. 3, 2004

(65) Prior Publication Data

US 2006/0121951 A1    Jun. 8, 2006

(51) Int. Cl.
*H04B 1/38*    (2006.01)
(52) U.S. Cl. .................. 455/574; 455/11.1; 455/41.2
(58) Field of Classification Search ............... 455/41.2, 455/41.3, 552.1, 553.1, 11.1, 574
See application file for complete search history.

(56) References Cited

U.S. PATENT DOCUMENTS

| | | | |
|---|---|---|---|
| 6,323,775 B1 | 11/2001 | Hansson | |
| 6,459,896 B1 | 10/2002 | Liebenow | |
| 6,624,750 B1 | 9/2003 | Marman et al. | |
| 6,717,520 B1 | 4/2004 | Dorenbosch | |
| 6,735,417 B2 * | 5/2004 | Fonseca et al. | 455/11.1 |
| 2003/0117316 A1 * | 6/2003 | Tischer | 342/357.1 |

OTHER PUBLICATIONS

U.S. Appl. No. 10/701,749, filed Nov. 5, 2003, Mock et al.

* cited by examiner

*Primary Examiner*—Lee Nguyen

(57) ABSTRACT

A wireless communications device (200) that has a battery power source (330) and that has a power source monitor (332) that produces a low energy notification upon determination of a low energy condition within the battery. The wireless communications device further has a notification list specifying at least one other communications device to receive the low energy notification message. The wireless communications device (200) also has a notification transmitter (316, 314, 304) for transmitting the low energy notification message to communications devices held by other users (504, 506, 508, 512) that are in the list. The low energy notification message has at least one destination address to which the low energy notification message is to be sent. The wireless communications device (200) further serves as a proxy or surrogate relay for other wireless communications devices (200) to provide a robust communications system.

13 Claims, 7 Drawing Sheets

COMMUNICATIONS DEVICE WITH LOW ENERGY NOTIFICATION

FIELD OF THE INVENTION

The present invention generally relates to the field of communicating low battery notifications for communications devices and more particularly relates to techniques for communicating low battery notifications to specified recipients.

BACKGROUND OF THE INVENTION

Mobile wireless communications devices are continually being developed with more features and functionalities. These developments in features and functionalities are, however, further stressing the capabilities of battery chemistry and the design of batteries for these mobile wireless communications devices. The further desire to continually shrink the size and weight of wireless communications devices also leads to a desire to shrink battery sizes. As a result, the usable battery life for wireless communications devices of today is unfortunately decreasing.

Convenient and reliable communications is one reason many people use wireless communications devices. For example, being able to keep in touch with a teenage child or other loved one and knowing that he or she can keep in touch with you is one of the fundamental principals behind why most parents buy a cellular phone for their children. Aspects of our busy lives and especially the social lives of children do not always allow for time to replenish cellular phone batteries. A child or teen being notified of a low battery condition in his or her cellular phone will tend to ignore the alert and think nothing of it until either he or she needs to contact someone, or until the batter is totally dead. This results in leaving the parent and child unable to reach each other through the child's cellular phone—destroying the benefit for which the cellular phone was purchased and maintained.

Therefore a need exists to overcome the problems with the prior art as discussed above.

SUMMARY OF THE INVENTION

Briefly, in accordance with the present invention, a wireless communications device includes a power source that provides power to the device as well as a power source monitor for producing a low energy notification upon determination of a low energy condition of the power source of a device. The wireless communication device also has a notification list with at least one other communications device to receive a low energy notification message. The wireless communications device further has a notification transmitter for transmitting the low energy notification message to communications devices on the notification list. The low energy notification message includes at least one destination address for the low energy notification message.

Further in accordance with the present invention, a method for communicating a low energy notification message from a device includes the steps of maintaining a notification list with at least one communications device to receive the low energy notification message. The method also includes determining a low energy condition within a power source of the device and, when the low energy condition is determined, transmitting the low energy notification message to all communications devices in the list. The low energy notification message also comprises the at least one destination address for the low energy notification.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
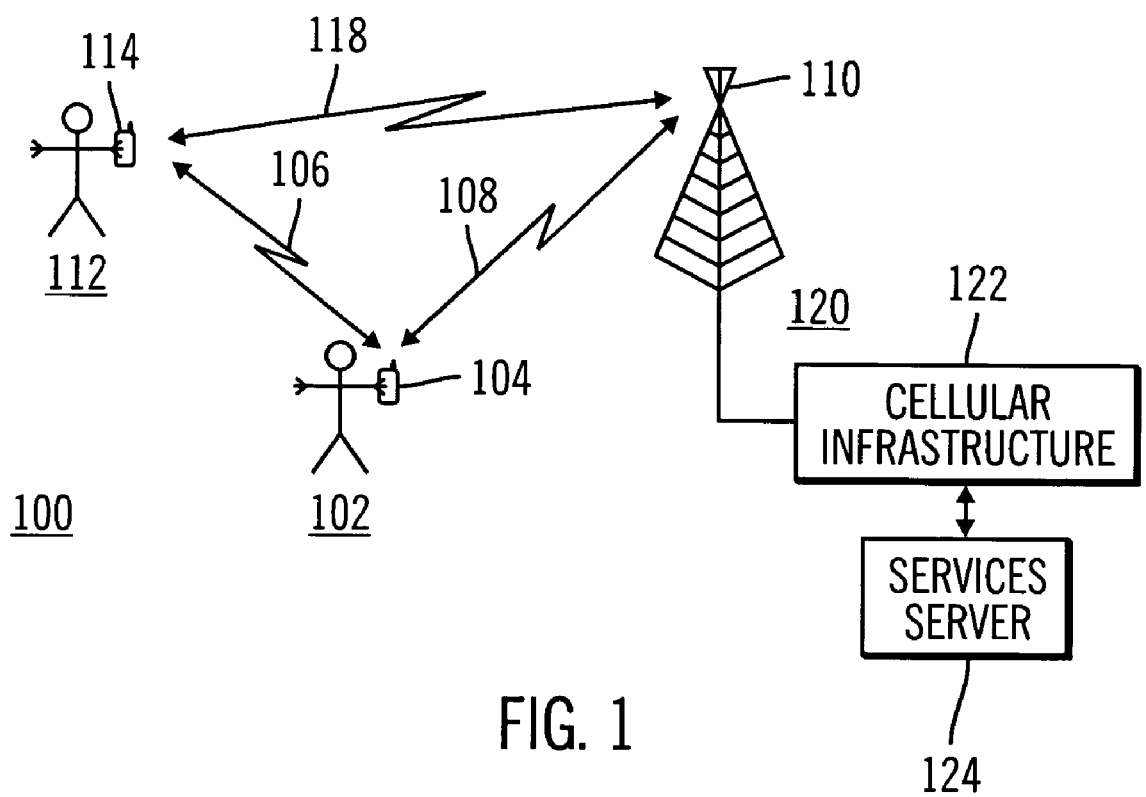
FIG. 1 illustrates a wireless communications environment that includes wireless devices according to an exemplary embodiment of the present invention.

FIG. 1 illustrates a wireless communications environment 100 that includes wireless devices according to an exemplary embodiment of the present invention. The exemplary wireless communications environment 100 shows two users, a first user 102 and a second user 112. Two users are illustrated in this example is for clarity of description, and embodiments of the present invention are able to operate with any number of users. Each of these two users has a wireless communications device, i.e., a first wireless communications device 104 and a second wireless communications device 114, respectively. The exemplary wireless communications environment 100 further includes a cellular base station 120 that includes a base station antenna 110. The cellular base station 120 is connected to a cellular infrastructure 122 that, in the exemplary embodiment, operates similarly to conventional cellular infrastructures. This description includes only one cellular base station 120 for clarity of description. Systems incorporating embodiments of the present invention are able to utilize one or more cellular infrastructure systems 122 that each include multiple cellular base stations 120 that operate to form a wireless communications system over a geographic area.

The cellular infrastructure 122 of the exemplary embodiment includes a connection to a services server 124. Services server 124 in the exemplary embodiment is a data processing system that implements user services for subscribers to the cellular phone infrastructure. Examples of such user services include a low battery exchange program in which cellular phones with low batteries automatically transmit their geographical location along with possibly other information defining battery type, e.g. make and model to the services server 124 and the services server 124 responds with the location of a retail location that will provide a fully charged replacement battery in exchange for the low battery in the cellular phone.

The first wireless communications device 104 and the second wireless communications device 114 in the exemplary embodiment are able to directly communicate with one another over a direct wireless link 106. An example of this mode of communications includes the first wireless communications device 104 transmitting a wireless signal, and the second wireless device 114, in turn, receiving that signal to provide wireless communications over the direct wireless link 106 from the first wireless device 104 directly to the second wireless device 114. A similar wireless communications link is able to be established from the second wireless device 114 to the first wireless device 104. Some embodiments of the present invention support simultaneous bi-directional communications between the first wireless communications device 104 and the second wireless device. Some embodiments also support communications in a simplex mode, which is also known as a dispatch mode or a Push-To-Talk (PTT) mode. Simplex mode communications between two or more wireless communications devices has one wireless communications device, such as the first wireless communications device 104, transmitting a wireless signal and other wireless communications devices all receiving that signal. One of the other wireless communications devices is then able to transmit signals after the first wireless communications device 104 completes its transmission. These bi-directional and simplex modes of communications are similar to those conventionally used between wireless communications devices. Further communications modes are also able to be employed in embodiments of the present invention. Additionally, data messages, such as textual messages transmitted according to the Short Message Service (SMS) protocol, are able to be exchanged between two or more wireless communications devices.

The wireless communications devices, such as the first wireless communications device 104 and the second wireless communications device 114, are also able to communicate in a communications mode that includes communication with a cellular base station 120, such as over a first base station wireless link 108 and a second wireless base station wireless link 118. Communications with the cellular base station 120 are also able to be performed by using either bi-directional and/or simplex modes of communications. Communications between two wireless communications devices can be accomplished through communications through cellular base station 120. Communications through the cellular base station 120, and on through the cellular infrastructure, further allow communications between wireless communications device and, for example, wired phone lines and Internet based data communications devices.

The wireless communications devices, such as the first wireless communications device 104 and the second wireless communications device 114, are able to communicate with each other through a variety of communications protocols. Of particular interest in the exemplary embodiment of the present invention, the wireless communications devices are able to communicate by using a lower power consumption wireless communications modes, such as a Bluetooth® communications links. The first wireless communications device 104 of the exemplary embodiment is able to be configured so that the Bluetooth® service discovery and association processing is initiated and performed according to the Bluetooth® protocol is performed in response to the low battery event. For example, the first wireless communications device is able to be configured to start the Bluetooth® device discovery process while the low battery state is detected. Other suitable embodiments include IEEE 802.11 wireless data communications protocols, such as IEEE 802.11a, 802.11b and 802.11g protocols defined by the Institute of Electrical and Electronic Engineers (IEEE) of New York, N.Y. Communicating via lower power consuming wireless communications modes is advantageous in the application of the exemplary embodiment of the present invention since less battery power is required in these modes and a wireless communications device with a low battery charge will be able to operate in such a mode when operation via higher power wireless communications modes, such as with cellular base station 120, is not reliable due to the low level of energy stored in the battery of the wireless communications device.

Figure 2:
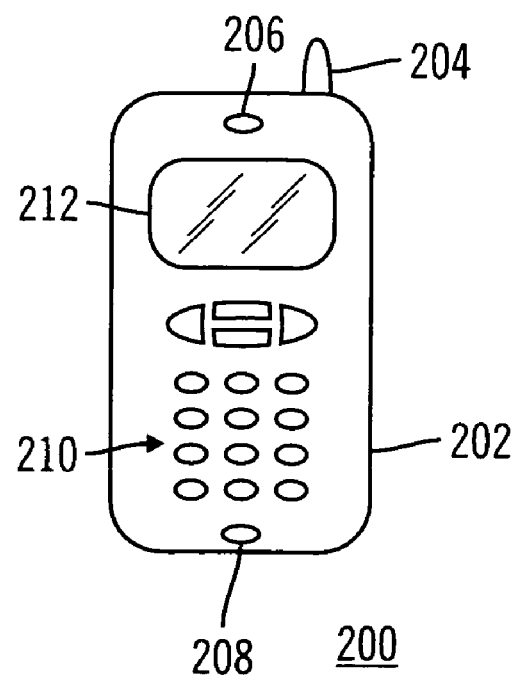
FIG. 2 illustrates a cellular phone that incorporates an exemplary embodiment of the present invention.

FIG. 2 illustrates a cellular phone 200 that incorporates an exemplary embodiment of the present invention. The exemplary cellular phone 200 corresponds to the wireless communications device described above. The exemplary cellular phone 200 includes a case 202 with several components. The exemplary cellular phone 200 has a display 212 that is able to display numeric and/or graphical information to the user. The exemplary cellular phone 200 further includes a keypad 210 that includes numeric keys and control keys as are commonly provided on cellular phones. The display 212 and keypad 210 of the cellular phone of the exemplary embodiment are able to accept contact names and telephone numbers, as well as other communications addresses, via user input for such purposes as entering a destination address for a low energy notification and/or entry of a notification list, as is described below.

The exemplary cellular phone 200 also has a speaker 206 and a microphone 208 to support voice communications over a wireless link. The exemplary cellular phone 200 further has a radio frequency signal antenna 204 used to transmit and receive wireless communications signals.

Figure 3:
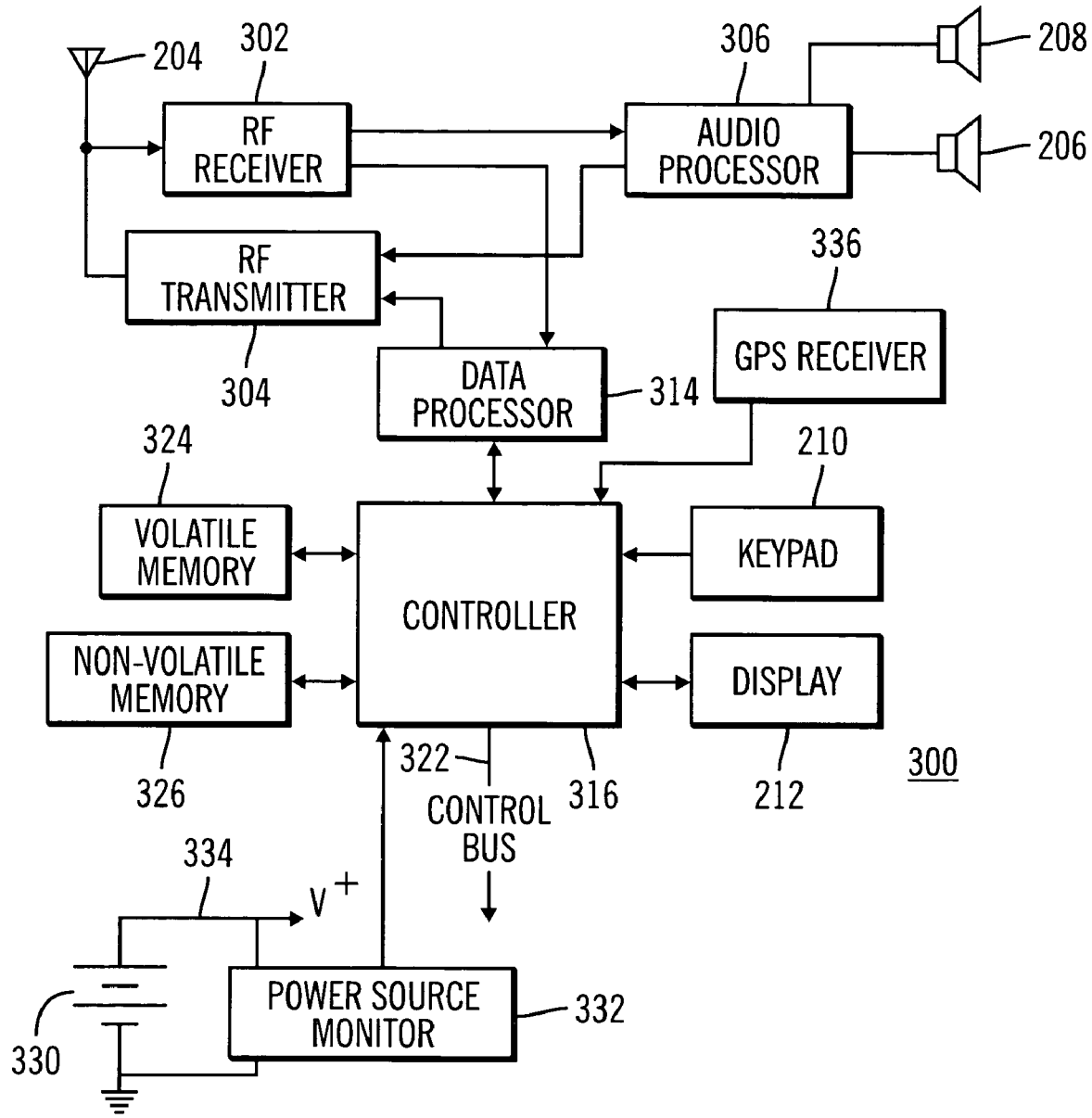
FIG. 3 illustrates a circuit block diagram for the exemplary cellular phone illustrated in FIG. 2.

FIG. 3 illustrates a circuit block diagram 300 for the cellular phone 200 according to an exemplary embodiment of the present invention. The exemplary cellular phone includes the antenna 204 connected to an RF receiver 302 and an RF transmitter 304. The exemplary cellular phone 200 is able to simultaneously transmit and receive voice and/or data signals. The RF Transmitter 304 and RF receiver 302 of the exemplary embodiment include dedicated and/or reprogrammable and/or reconfigurable circuits, including programmable processors, to support transmission over multiple wireless communications modes, such as various cellular telephone protocols, and/or wireless data communications protocols, such as the Bluetooth® protocol.

The RF receiver 302 and the RF transmitter 304 each connect to an audio processor 306 to provide and accept audio signals to support simplex and/or duplex voice communications over a wireless link. The audio processor 306 further accepts audio signals from the microphone 208 and provides suitably amplified audio signals to speaker 206 to support an audio interface with the user of the exemplary cellular phone 200.

The exemplary cellular phone 200 further includes a battery 330, which is a power source for the exemplary embodiment of the present invention. The exemplary cellular phone 200 also includes a power source monitor 332. Battery 330 is able to be recharged by connection to an external energy source (not shown). Battery 330 produces a power source $V^+$ 334 to supply direct current electrical power to the various components of the exemplary cellular phone 200. The power source monitor 332 of the exemplary embodiment monitors the output voltage of battery 330 to determine the amount of energy remaining in battery 330. A device specific voltage threshold is configured within the power source monitor 332 and when the output voltage of battery 330 falls below that threshold, a low energy condition is determined to exist. The power source monitor 332 produces a signal as an input to controller 316 to indicate this low energy condition when this low energy condition is determined to exist. The controller 316 of the exemplary embodiment commands the transmission of a low energy notification and further configures components within the cellular phone block diagram 300 into a low energy consumption mode, such as by disabling lights and rejecting incoming voice calls or to limit incoming voice calls to a pre-defined list of individuals, e.g. family members.

The controller 316 controls the operation of the cellular phone in the exemplary embodiment. Controller 316 is connected to the various components of the cellular phone via control bus 322. Controller 316 communicates data to external devices (not shown), such as a base station and/or a server, through a wireless link. Controller 316 provides data to and accepts data from data processor 314. Data processor 314 of the exemplary embodiment performs communications processing necessary to implement over-the-air data communications to and from external devices. For example, data processor 314 formats data messages and performs the processing to prepare and transmit or to receive SMS data messages or data packets via the Bluetooth® protocol. This combination of components forms a notification transmitter in the exemplary embodiment. Data processor 314 also provides data for transmission to the RF transmitter 304 and accepts received data from RF receiver 302.

Controller 316 provides visual display data to the user through display 212. Display 212 of the exemplary embodiment is a Liquid Crystal Display that is able to display alphanumeric and graphical data. Controller 316 also accepts user input from keypad 210. Keypad 210 is similar to a conventional cellular phone keypad and has buttons to accept user input in order to support operation of the exemplary embodiment of the present invention.

The exemplary cellular phone 200 further includes non-volatile memory 326. Non-volatile memory 326 stores program data and more persistent data for use by the controller 316. Data stored in non-volatile memory 326 of the exemplary embodiment can be changed under control of controller 316 if called for by particular processing performed by the controller 316. The exemplary cellular phone 200 further contains volatile memory 324. Volatile memory 324 is able to store transient data for use by processing and/or calculations performed by the controller 316. Notification lists and destination addresses for low energy notification messages, for example, are stored in non-volatile memory 326 in the exemplary embodiment so that these data are retained when battery energy is depleted. Further embodiments of the present invention are able to store notification lists and destination addresses in volatile memory 324 or in a combination of volatile memory 324 and non-volatile memory 326.

The exemplary cellular phone 200 includes a location detector that is a GPS receiver 336 in the exemplary embodiment. The GPS receiver 336 determines the geographic location of the exemplary cellular phone 200 and provides that geographic location to controller 316. Controller 316 is then able to create data messages, such as low energy notification messages, that include the location of the exemplary cellular phone and transmit those messages, as is described in detail below. Alternatively, the cellular phone 200 is able to derive location information using known techniques including, but not limited to; 1) location determination based upon triangulation processing of radio signal propagation delays to multiple cellular towers from the exemplary cellular phone, and 2) using the known geographic location of short range wireless access points utilized by, for example, IEEE 802.11b, 802.11a, 802.11g and/Bluetooth® communications links. These access points in the exemplary embodiment are able to provide their location reference as part of the short range wireless network joining process.

Figure 4:
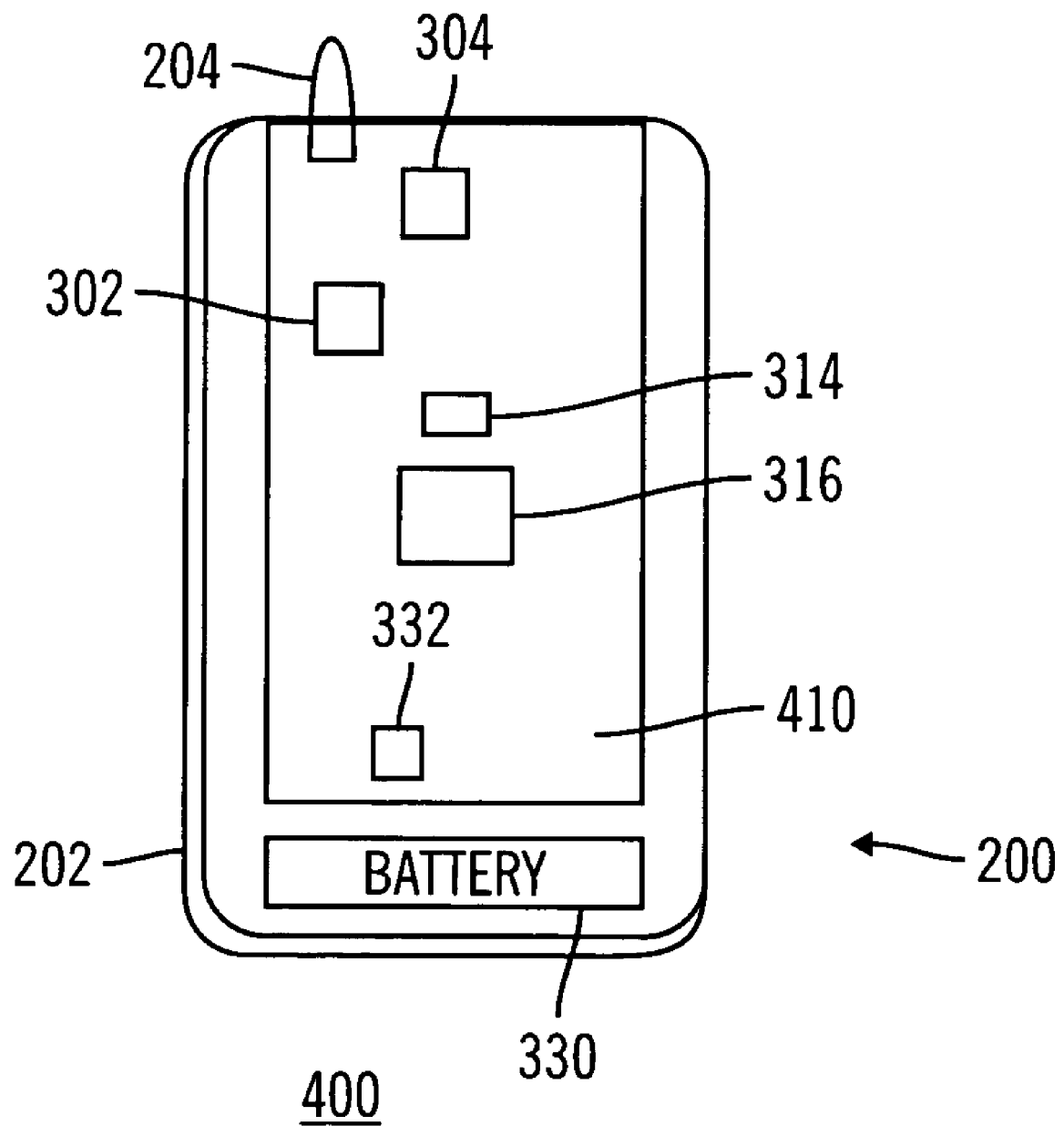
FIG. 4 illustrates a rear cut-away view for the exemplary cellular phone illustrated in FIG. 2.

FIG. 4 illustrates a rear cut-away view 400 for the cellular phone 200 according to an exemplary embodiment of the present invention. The case 202 of the exemplary cellular phone 200 provides a mounting for the antenna 204 and contains a printed circuit board 410. The printed circuit board 410 of the exemplary embodiment has a number of components mounted thereto. The printed circuit board 410 provides conductive interconnections between and among these components. Printed circuit board 410 includes circuits for the RF receiver 302 and circuits for the RF transmitter 304. The RF receiver 302 and RF transmitter 304 of the exemplary embodiment are connected to antenna 204 through circuitry and conductive connections contained on the printed circuit board 410 so as to allow simultaneous RF transmission and RF reception by the RF transmitter 304 and RF receiver 302. Further embodiments of the present invention alternately perform one of RF transmission and RF reception in a simplex mode.

The rear cut-away view 400 further shows battery 330 and power source monitor 332. As discussed above, power source monitor is communicatively connected to controller 316 to provide a low energy indication to the controller 316 and trigger a low battery energy state and wireless transmission of a low energy notification message during the low energy condition.

The exemplary embodiments of the present invention advantageously provide wireless communications devices, such as the exemplary cellular phone 200, that monitor the level of energy available in their battery and send low energy notifications to one or more specified recipients. The recipients, of the low energy notification are specified in the exemplary embodiment by the user of the cellular phone 200 in the manner described below. Further embodiments allow other mechanisms to specify the recipients of low energy notifications.

The exemplary cellular phone 200 further provides functionality to relay low energy notification messages that are received from other wireless communications devices, such as other cellular phone. The exemplary cellular phone 200 is able to communicate with another cellular phone via a point-to-point communications link that includes low power communications modes, such as communications links that conform to the Bluetooth® protocol. By using such low power communications modes, the cellular phone that has low battery energy is able to communicate with neighboring cellular phones when a communications link to a cellular base station 120, such as the first base station wireless link 108, might not be usable due to a low battery condition. The cellular phone may also not be able to use the first base station wireless link 108 due to path blockage, such as by being indoors, or due to insufficient battery energy to sufficiently drive a higher power RF link.

Figure 5:
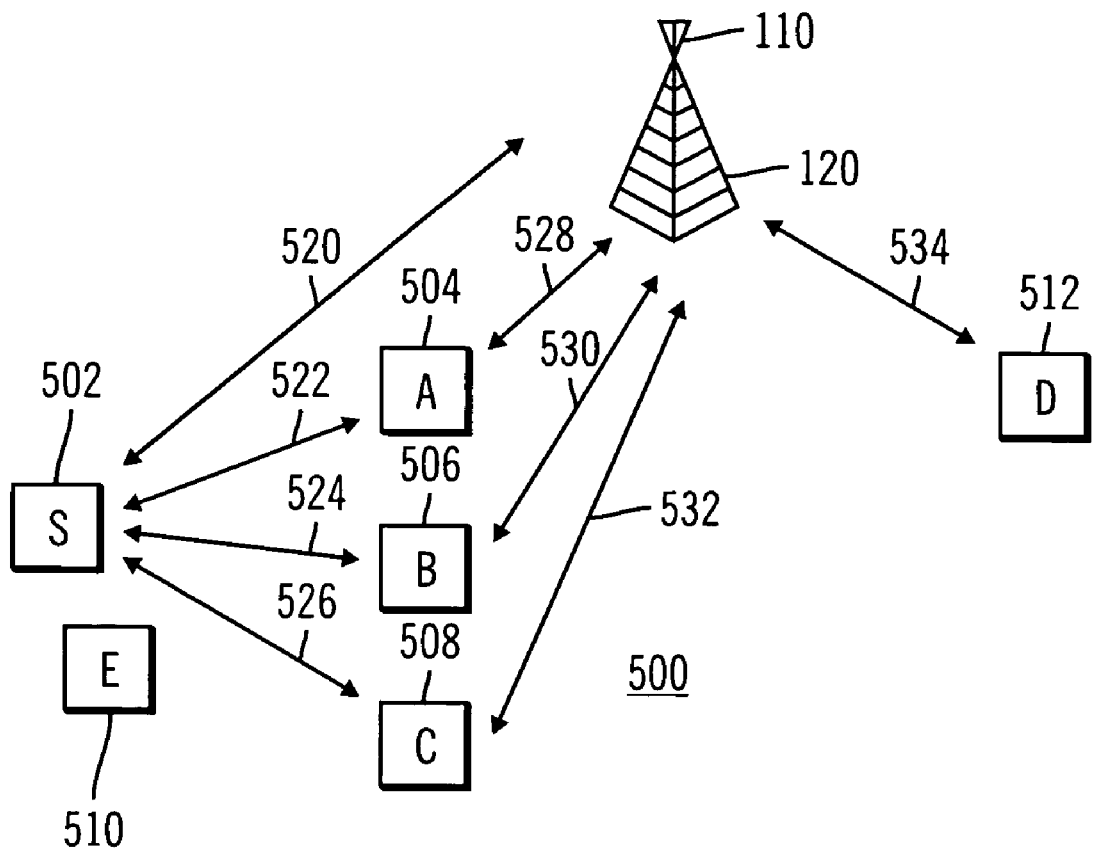
FIG. 5 illustrates a first operational scenario for wireless communications devices that incorporate embodiments of the present invention.

FIG. 5 illustrates a first operational scenario 500 for wireless communications devices that incorporate embodiments of the present invention. This first operational scenario is representative of a scenario where, for example, a daughter has an exemplary cellular phone 200 and her mother requires the daughter to send a low battery energy notification message when the daughter's cell phone battery is substantially depleted. In this example, the daughter is illustrated as Source User S 502 and her mother is depicted as Destination User D 512. In this example, the Destination User D 512 is illustrated as using a wireless communications device. The Destination User D 512 is alternatively able to use a wired telephone device to receive a recorded voice call or a wireless or wired data communications device to receive a text, voicemail and/or other suitable formatted message.

In the first operational scenario 500, the Source User S 502 is hanging out with some friends, who are depicted as User A 504, User B 506, User C 508, and User E 510 at a common location. In the first operational scenario 500, a low battery event is detected by the power source monitor 332 in the exemplary cellular phone 200 held by the Source User S 502. The exemplary cellular phone 200 held by Source User S 502 in this example is configured to send a low battery energy notification message with a destination address that corresponds to the Destination User D 512. This exemplary cellular phone 200 is further configured to have a notification list for the low energy notification message that corresponds to User A 504, User B 506 and User C 508. User E 510 is not included in this list. This notification list is used to specify or identify surrogate or proxy wireless communications devices that are used to receive and relay low energy notification message to specified destinations, such as a child's parents.

The detected low energy condition in this example causes the exemplary cellular phone 200 held by the daughter, i.e., the Source User 502, to send a notification to her parent and possibly others through, for example, a short text message that her device has a low battery. This short text message is further able to indicate that the daughter will seek alternative modes of communication when necessary. In the first operational scenario 500, the exemplary cellular phone 200 held by the daughter, i.e., Source User S 502, searches out, using a short range, lower power wireless capability in this example, for other cellular phones that are held by friends or other known associates that are in the daughter's contacts list that is maintained within the exemplary cellular phone 200. These other cellular phones will be used as surrogate or proxy devices to communicate the low energy notification message to the Destination User D 512. Once a communications device used by the Destination User D 512 receives the low energy notification message, it returns an acknowledgement to the Source User S 502. This acknowledgement is received by the exemplary cellular phone 200 held by the daughter, i.e., Source User S 502

In the first operational scenario 500, User A 504, User B 506, and User C 508 are in the contacts list and therefore their wireless communications devices are requested to perform as a proxy or surrogate transmitter for the daughter's exemplary cellular phone 200 and to transmit updated status messages over the wide area network back to the parent, i.e., Destination User D 512, for as long as the low battery state exists. In the first operational scenario 500, the exemplary cellular phone held by Source User S 502 also transmits a low battery energy notification message to the cellular base station 120 for retransmission to the Destination User D 512. The exemplary cellular phone held by Source User S 502 further broadcasts low battery energy notification messages to exemplary cellular phones held by User A 504 via first link 522, User B 506 via second user link 524, and User C 508 via third link 526. The first user link 522, second user link 524 and third user link 526 are able to be high RF power point-to-point links or low RF power links of any suitable protocol and/or standard. The cellular phone held by User A 504 receives the low battery energy notification from the exemplary cellular phone held by Source User S 502 and relays the low energy notification message to the Destination User D 512 by transmitting the low energy notification message to cellular base station 120 via first tower link 528. Similarly, the cellular phones held by User B 506 and User C 508 each receive the low battery energy notification from the exemplary cellular phone held by Source User S 502 and relay the low energy notification message to the Destination User D 512 by transmitting the low energy notification message to cellular base station 120 via a second tower link 530 and a third tower link 532, respectively.

Further embodiments of the present invention utilize wireless access points, such as those provided by a public or private Wireless Area Network (WAN) based upon IEEE 802.11 standards. As an example, a wireless access point located at a public hot spot, such as the mall, can be used to receive a low energy notification message from the exemplary cellular phone held by Source User S 502 and relay this message to Destination User D 512 via any suitable mode. In these embodiments, the wireless access points are notified of the low battery condition and a notification is sent to the Destination User D 512. Some of these embodiments include an authentication mechanism to authenticate the originator of the low energy notification message, e.g., the daughter, to provide improved certainty of the notification for the parent. Some embodiments of the present invention provide settings within the wireless device to control, for example, providing the notification with: the location of the wireless device with a low battery; further low battery status; and/or the use of short range wireless connectivity to nearby devices. These settings are able to be entered via the user interface of the exemplary cellular phone 200, e.g., via keypad 210 and display 212, or these settings are able to be entered on a remote device and wirelessly downloaded to the exemplary cellular phone 200.

Figure 6:
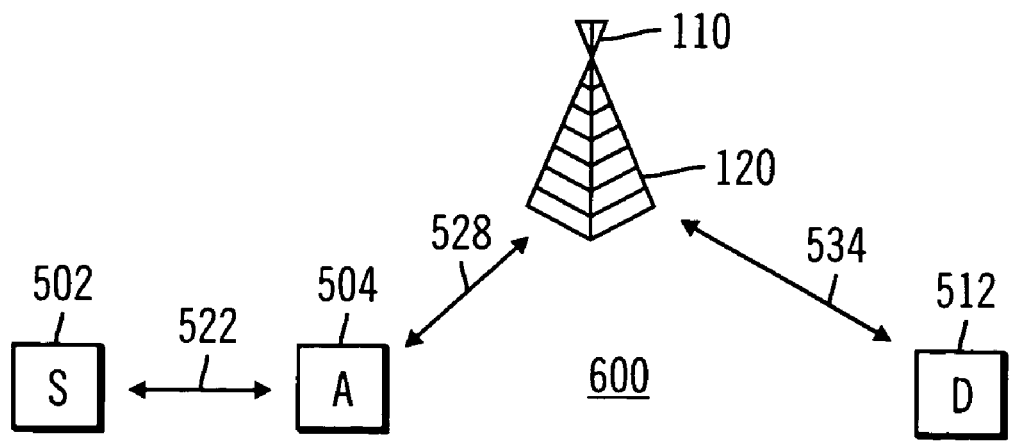
FIG. 6 illustrates a second operational scenario for wireless communications devices that incorporate embodiments of the present invention.

FIG. 6 illustrates a second operational scenario 600 for wireless communications devices that incorporate embodiments of the present invention. In the second operational scenario 600, the daughter, i.e., Source User S 502, departs the common location illustrated in the first operational scenario 500 with User A 504. User B 506 and User C 608 have also departed and are not in proximity, and therefore not in communications range, to the Source User S 502. In the second operational scenario 600, the cellular phone held by User A 504 still provides status updates to Destination User D 512, via cellular base station 120 through the first tower link 528, since User A 504 is still in close proximity, and therefore within communications range, of the daughter, i.e., Source User S 502.

Figure 7:
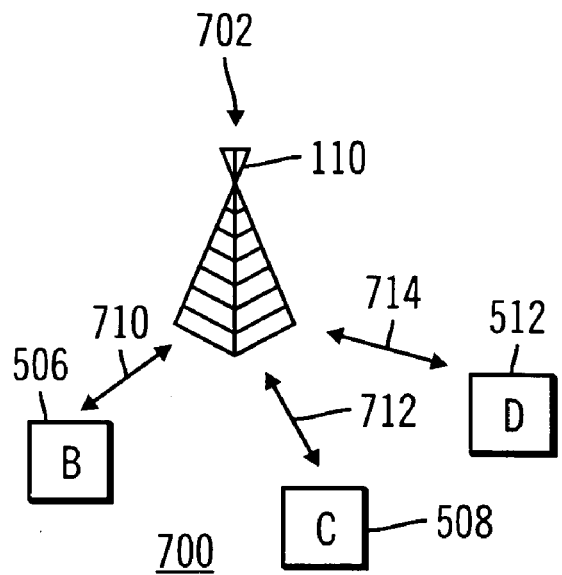
FIG. 7 illustrates a third operational scenario for wireless communications devices that incorporate embodiments of the present invention.

FIG. 7 illustrates a third operational scenario 700, in which User B 506 and User C 508 have departed from the Source User 502, for wireless communications devices that incorporate embodiments of the present invention. In the third operation scenario 700, the cellular phones held by User B 506 and User C 508 detect that they are not within proximity of the exemplary cellular phone 200 held by the daughter, i.e., Source User S 502, and therefore provide a status update from User B 506 and User C 508 to the destination User D 512 that these users are no longer in contact with the Source User S 502. In some instances the cellular phone held by User B 506 and User C 508 may be out of range of cellular coverage while the cellular phone of User S 502 experiences a low battery condition and transmits a low battery energy notification. Additionally, the cellular phones held by User B 506 and User C 508 in the exemplary embodiment of the present invention detect that they are no longer within proximity to the exemplary cellular phone held by Source User S 502 due to the loss of the low RF power links, i.e., the second user link 524 and the third user link 526. This mode of operation advantageously allows the cellular phones held by User B 506 and User C 508 to successfully relay the low battery energy notification that was received while User B 506 and User C 508 were in proximity to Source user 502.

In the third operation scenario 700, the cellular phones held by User B 506 and User C 508 depart from the vicinity of Source User 502 and are able to retransmit the low battery energy notification received from the cellular phone held by Source User 502. This retransmission can advantageously occur at times when the cellular phones held by Source User 502 and the other users in proximity to the Source user 502 are not able to successfully transmit the low battery energy notification message to cellular base station 120, such as when those users are in a building or otherwise blocked from the cellular base station 120. In the third operation scenario 700, although the Source User 502 and User A 504 may be within a building and unable to communicate to a cellular base station 120, User B 506 and User C 508 have, for example, departed the building and their cellular phones, which received the low battery energy notification when they were in proximity to Source User S 502, are now able to successfully retransmit the low battery notification received from the Source User S 502 to the Destination User D 512.

Figure 8:
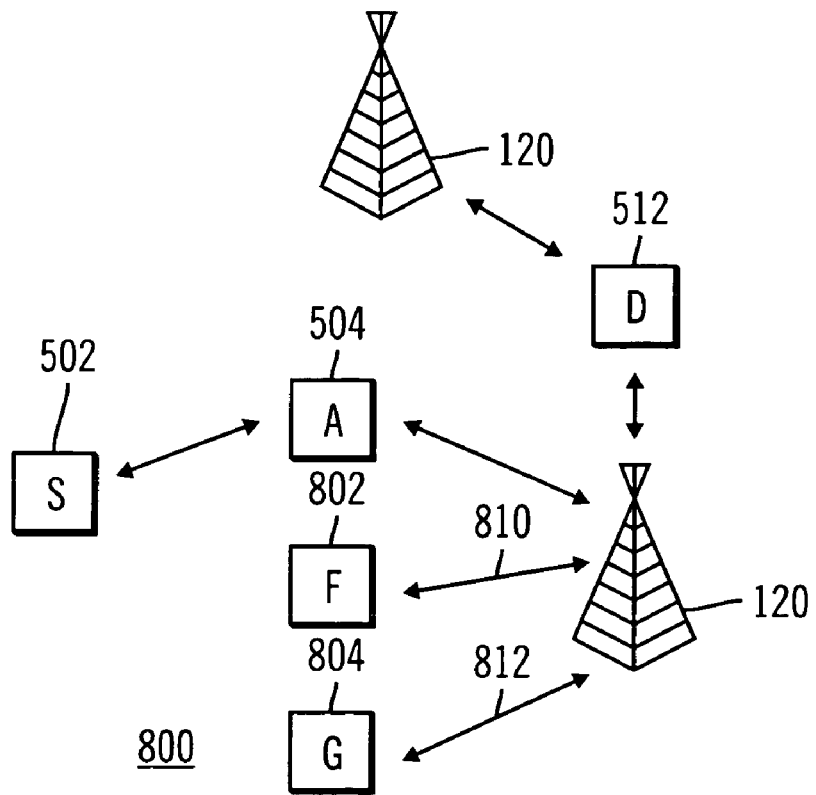
FIG. 8 illustrates a fourth operational scenario for wireless communications devices that incorporate embodiments of the present invention.

FIG. 8 illustrates a fourth operational scenario 800 for wireless communications devices that incorporate embodiments of the present invention. In the fourth operational scenario, new associations and additional requests to relay status information to the parent are formed as the User F 802 and User G 804 come within proximity, and thereby within communications range, of the daughter, i.e., Source User S 502, during the low energy condition. In this example, User F 802 and User G 804 are also listed as contacts in the exemplary cellular phone 200 held by the Source User S 502. The exemplary cellular phones held by User F 802 and User G 804 have the low energy notification message transmitted to them as they come within communications range of the exemplary cellular phone 200 held by Source User S 502 These devices are then also used as additional proxy or surrogate relays to provide a more reliable message delivery system. In this example, User F 802 and User G 804 are detected by the Bluetooth® detection process that is initiated during the low energy condition in the exemplary cellular phone 200 of the exemplary embodiment.

Further embodiments of the present invention are able to be configured to use only one cellular phone to relay the low battery energy status information over the wide area network, but having additional relays, as described by the operational scenarios above, provides an additional comfort level to the users, such as to the parent(s) of children who may have cellular phones with depleted batteries.

In the exemplary embodiment of the present invention, people other than the Destination User D 512 that are trying to contact the Source User S 502 receive a message indicating that the cellular phone for Source User S 502 is in a special power mode and will not take calls at this time. The cellular infrastructure 122 of this exemplary embodiment processes the initial low energy notification message and configures itself to provide the appropriate message to callers of Source User S 502.

Figure 9:
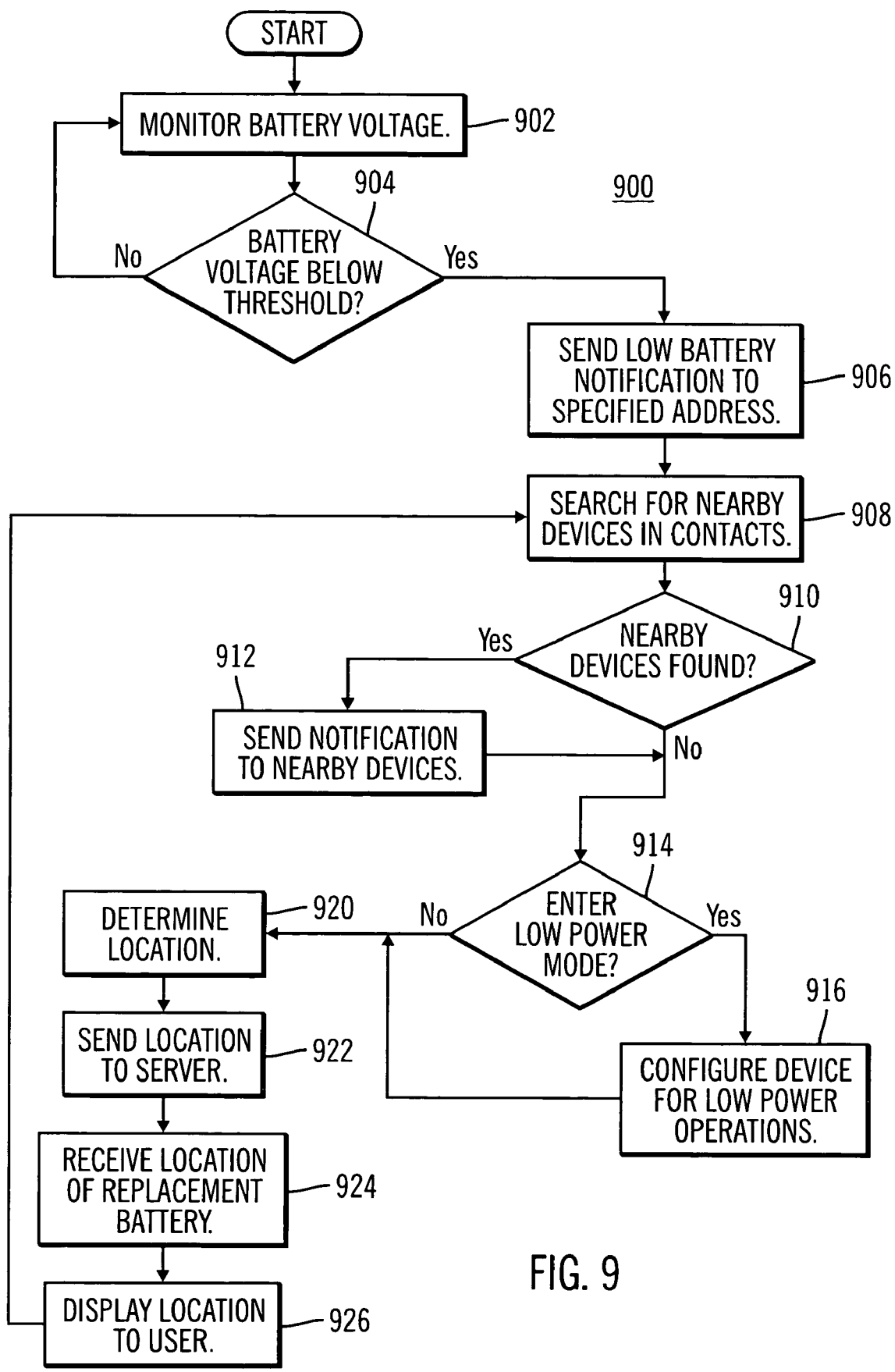
FIG. 9 illustrates a low energy detection processing flow performed by an exemplary embodiment of the present invention.

FIG. 9 illustrates a low energy detection processing flow 900 performed by an exemplary embodiment of the present invention. The low energy detection processing flow begins by monitoring, at step 902, the voltage of a battery powering the device, such as battery 330. The output voltage of battery 330 in this embodiment is an indication of the level of energy remaining in the battery 330. The processing next determines, at step 904, if the monitored battery voltage is below a threshold. In the exemplary embodiment, battery 330 is a Lithium Ion battery with a programmable output voltage typically below about 3.15 volts for that battery is declared to be a low energy condition for that battery. If the battery voltage is not determined to be below the threshold, the processing returns to monitoring, at step 902, the battery voltage.

If the battery voltage is determined to be below the threshold configured for this device, the processing then sends, at step 906, a low battery notification to specified addresses that are configured within the exemplary cellular phone 200. As described above, the exemplary cellular phone stores one or more destination addresses to which low energy notification messages are to be sent. As an example, a child may have his or her cellular phone configured to send a low energy notification message to a parent.

The processing then searches, at step 908, for nearby devices listed in the contacts list of the exemplary cellular phone 200. In the exemplary embodiment, the cellular phone 200 is able to detect and communicate with other cellular phones via a low RF power communications link. The contacts list of the exemplary cellular phone stores names of individuals with whom the user is familiar. Limiting the search for nearby device to devices listed in the contacts list limits communications to only communications devices held by trusted individuals.

The processing next determines, at step 910, if nearby devices have been found from the search of the preceding step. If such nearby devices have been found, low energy notification messages are sent, at step 912, to those nearby devices. Those nearby devices then relay the low energy notification message to the destination address contained within the low energy notification message, as is described below.

Once the low energy notification message is sent to nearby devices or if no nearby devices were found, the processing next determines, at step 914, if the device is configured to enter into a low power mode once a low battery energy state is detected. If the device is to be configured into a low power mode, the exemplary cellular phone 200 is configured, at step 916, for low power operations. Examples of low power operations modes include not accepting incoming calls, extinguishing device backlights, and other power conserving measures. The cellular infrastructure 122 of some embodiments of the present invention processes the low energy notification message or accepts a further defined low energy message from cellular phones. These cellular infrastructures 122 are able to intercept calls to a device that has sent a low energy notification message and provide, for example, a message to the caller that the phone being called has a low battery.

After either determining that the cellular phone is not to be configured into a low power mode or after configuring the cellular phone into a low power mode, the processing of the exemplary then determines, at step 920, the geographical location of the cellular phone. The processing of the exemplary embodiment determines geographical location through the use of a GPS receiver 336. Further embodiments of the present invention are able to determine geographic location through any suitable technique.

The processing of the exemplary embodiment then sends, at step 922, the determined geographic location to the services server 124 that is connected to the cellular infrastructure 122. Some embodiments of the present invention operate with a business model in which stores offer the ability for a user to exchange their battery for a fully charged battery. A number of plans are able to be offered in such a business model, with a premium plan being offered to an entire family. In this premium plan, the family pays, for example, a monthly fee that insures the ability to exchange batteries whenever a low battery event occurs. In this example, the notification with the geographical location is sent from the cellular phone, for example, a daughter's cellular phone, to the services server 124 that is connected to the cellular infrastructure. The services server 124 accepts and processes the cellular phone's geographic location information and returns a data message to the cellular phone that contains a location of a replacement battery for the cellular phone 200. In the exemplary embodiment, the services server 124 returns the location of the closet store that provides the battery exchange service under the battery exchange plan to which the user subscribes.

The processing of the exemplary embodiment continues with the cellular phone 200 receiving, at step 924, the location of a retailer that has a replacement battery for the cellular phone. The processing then displays, at step 926, this received location to the user, such as on display 212 of the exemplary cellular phone 200. The processing then returns to searching, at step 908, for nearby devices in the contacts list and continues the processing described above. The exemplary embodiment iteratively searches for nearby devices and receives updated locations of replacement batteries to continually provide low energy notification messages and battery replacement information to the user. Some embodiments of the present invention transmit the determined geographic location of the cellular phone to the services server 124 and a recharged battery is then delivered to the geographic location of the cellular phone with the depleted battery. This latter option is beneficial to emergency services personnel who are unable to leave their location to retrieve a recharged battery.

Further embodiments of the present invention incorporate a timer into the wireless communications device that is triggered or enabled upon a change in status of the device, such as a low battery event. Such events can cause the wireless device, for example, to turn off in order to provide a longer period of usable battery life. This feature can be programmed by the user or by the network operator so that the wireless device will restart after a period. If the user of the wireless device is, for example, currently using the wireless device for a voice call and the low battery status is detected, the user is provided with a visual message display in these embodiments and prompted that the voice call will be terminated unless the user selects to override this function, such as by pressing a specified button on the keypad of the wireless device. Such message displays continue through predetermined energy level thresholds until the call is complete. Once the call is complete in some of these embodiments, the wireless device sets its status to reflect the low energy condition the wireless device and then turns off.

During the operation of this timer, the wireless device continues to display and update message displays to the user as defined by the configuration of the device. If the user selects to override the shutdown function and the battery status is critically low, as defined by a threshold configured for the device, the wireless device continues to display status messages while the user is on the call. The wireless device will not turn off until at least the low energy notification message has been wirelessly transmitted. Some embodiments of the present invention process transmission confirmation messages that are transmitted to the wireless device from the cellular infrastructure, or nearby wireless devices acting as proxy relay stations, that confirm to the wireless device that the low energy notification message transmission is complete and that the device can turn off to preserve the remaining energy in the battery.

Figure 10:
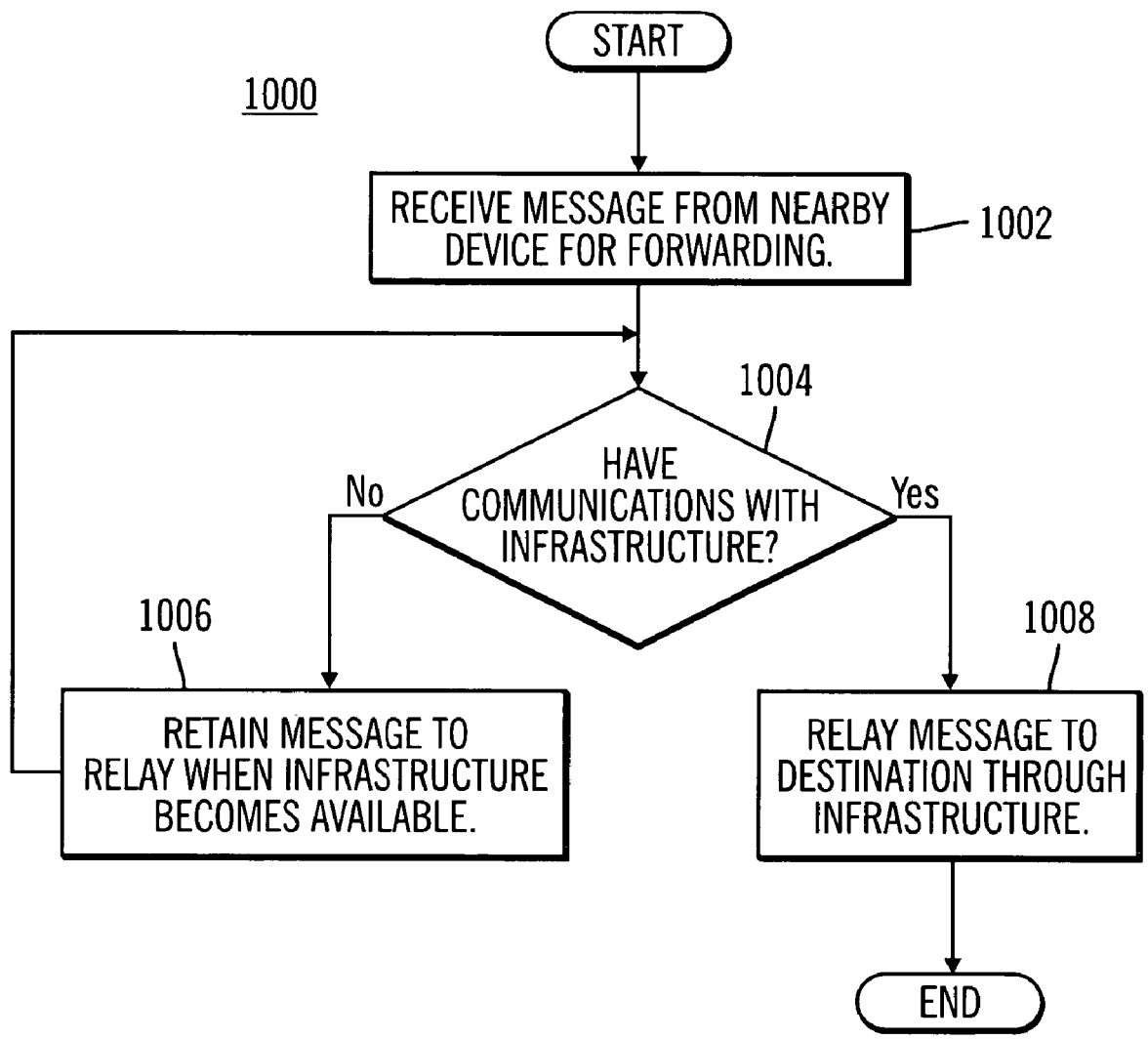
FIG. 10 illustrates a notification relay processing flow performed by an exemplary embodiment of the present invention.

FIG. 10 illustrates a notification relay processing flow 1000 performed by an exemplary embodiment of the present invention. The notification relay processing flow 1000 is performed by nearby cellular phones in the exemplary embodiment, as is described above. The notification relay processing begins by receiving, at step 1002, a message from a nearby device for forwarding. This message corresponds to a low battery notification as transmitted by a nearby cellular phone at step 912 in the above described low energy detection processing flow 900. The processing next determines, at step 1004, if this communications device has communications with the cellular infrastructure 122, such as via cellular base station 120. If it is determined that this communications device does not have communications with the cellular infrastructure, the processing retains, at step 1006, the notification message. This notification message is retained until communications with the infrastructure become available. The processing then returns to determining, at step 1004, if the communications with the infrastructure is available.

If it is determined, at step 1004, that this device has communications with the infrastructure, the processing then relays, at step 1008, the notification message through the infrastructure to the destination address. This relaying continues to be performed even while the nearby cellular phone is no longer in communications with the other wireless device. Some embodiments of the exemplary embodiment include in the relayed message a notification that the nearby cellular phone is no longer in communications with the other wireless device so as to notify this status to the destination address for the notification message. The processing for this communications device in relaying this notification message is then complete.

The exemplary embodiments of the present invention provide a robust notification communications system in which low battery energy notification status messages are communicated to specified destination addresses. Such operations provide, for example, piece of mind to parents that they will be notified when their children's cell phone battery is low. These embodiments further provide a mechanism to notify the user of a wireless communications device of a nearby location where a replacement battery is able to be obtained. These benefits serve to preserve the purpose for which parents purchase cellular phones for their children.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows a the computer to read data, instructions, messages or message packets, and other computer readable information. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A wireless communications device comprising;
a power source that provides power to a device;
a power source monitor for producing a low energy notification upon determination of a low energy condition of the power source of the device;
a notification list comprising at least one other communications device to receive a low energy notification message; and
a notification transmitter for transmitting the low energy notification message to communications devices on the notification list, the low energy notification message comprising at least one destination address for the low energy notification message, wherein the notification transmitter further:
transmits the low energy notification message to a first remote communications device that is within communications range;
detects, during the low energy condition, a second communications device that comes within communications range during the low energy condition; and
transmits the low energy notification message to the second communications device.

2. The wireless communications device of claim 1, wherein the at least one destination address is user specified.

3. The wireless communications device of claim 1, wherein the power source monitor triggers a low power operating mode in response to the determination of a low energy condition.

4. The wireless communications device of claim 1, further comprising a primary transmitter that transmits over a primary communications network, wherein the notification transmitter communicates the low power notification message over a secondary communications network.

5. The wireless communications device of claim 1, further comprising a notification relay processor that receives low energy notification messages from other wireless communications devices and relays the external low energy notification messages to destination addresses contained in the low energy notification messages.

6. A wireless communications device comprising;
a power source that provides power to a device;
a power source monitor for producing a low energy notification upon determination of a low energy condition of the power source of the device;
a notification list comprising at least one other communications device to receive a low energy notification message;
a notification transmitter for transmitting the low energy notification message to communications devices on the notification list, the low energy notification message comprising at least one destination address for the low energy notification message; and
a location detector that determines a geographic location during the low energy condition, and wherein the low energy notification message contains the geographic location.

7. A method for communicating a low energy notification message from a device, the method comprising the steps of:
maintaining a notification list comprising at least one communications device to receive the low energy notification message;
determining a low energy condition of a power source of the device;
when a low energy condition is determined, transmitting the low energy notification message to the communications devices on the list, the low energy notification messages comprising at least one destination address for the low energy notification message;
receiving a second low energy notification message from another wireless communications device, the second low energy notification message comprising a second destination address; and
relaying the second low energy notification message to the second destination address; and
continuing the relaying while no longer in communications with the other wireless communications device.

8. The method of claim 7, further comprising the step of accepting the destination address from a user.

9. The method of claim 7, further comprising the step of entering a low power operating mode when a low energy condition is determined.

10. The method of claim 7 wherein the transmitting step comprises communicating the low energy notification message over a secondary communications network, and transmitting the low energy notification message over a primary communications network.

11. The method of claim 7 further comprising receiving, in response to the transmission of the low energy notification message, an acknowledgement message from the at least one communications device to receive the message.

12. The method of claim 7 further comprising:
transmitting the low energy notification message to a services server; and
receiving, from the services server, a location of a replacement battery.

13. The method of claim 7 further comprising initiating communications device discovery processing in response to the low energy condition.

* * * * *